(12) United States Patent
Rumph et al.

(10) Patent No.: US 7,345,786 B2
(45) Date of Patent: Mar. 18, 2008

(54) METHOD FOR COLOR CAST REMOVAL IN SCANNED IMAGES

(75) Inventors: David E. Rumph, Pasadena, CA (US); Charles M. Hains, Altadena, CA (US)

(73) Assignee: Xerox Corporation, Norwalk, CT (US)

( * ) Notice: Subject to any disclaimer, the term of this patent is extended or adjusted under 35 U.S.C. 154(b) by 968 days.

(21) Appl. No.: 10/368,690

(22) Filed: Feb. 18, 2003

(65) Prior Publication Data
US 2004/0160615 A1 Aug. 19, 2004

(51) Int. Cl.
*G06F 15/00* (2006.01)
(52) U.S. Cl. .................. 358/1.9; 358/3.03; 358/518; 345/589; 345/591; 382/167; 382/163
(58) Field of Classification Search .............. 358/1.9, 358/3.03, 518; 345/589, 591; 382/167, 382/163
See application file for complete search history.

(56) References Cited

U.S. PATENT DOCUMENTS

| 4,972,257 | A | | 11/1990 | Birnbaum et al. ............. 358/80 |
| 5,233,413 | A | | 8/1993 | Fuchsberger ................. 358/80 |
| 5,315,380 | A | * | 5/1994 | Ingraham et al. ........... 358/500 |
| 5,343,311 | A | * | 8/1994 | Morag et al. ................ 358/518 |
| 5,517,334 | A | * | 5/1996 | Morag et al. ................ 358/518 |
| 5,747,802 | A | * | 5/1998 | Arnold et al. ............... 250/307 |
| 6,154,221 | A | * | 11/2000 | Gangnet ....................... 345/442 |
| 6,377,702 | B1 | * | 4/2002 | Cooper ......................... 382/167 |
| 6,469,805 | B1 | | 10/2002 | Behlok ......................... 358/1.9 |
| 6,484,631 | B2 | | 11/2002 | Degani et al. ............... 101/171 |
| 6,490,364 | B2 | * | 12/2002 | Hanna et al. ................ 382/107 |
| 2003/0095274 | A1 | * | 5/2003 | Hagai et al. ................. 358/1.9 |
| 2003/0098986 | A1 | * | 5/2003 | Pop .............................. 358/1.9 |
| 2003/0123072 | A1 | * | 7/2003 | Spronk ........................ 358/1.9 |
| 2003/0193677 | A1 | * | 10/2003 | Zeng ............................ 358/1.9 |
| 2005/0008222 | A1 | * | 1/2005 | Gallina ........................ 382/162 |

* cited by examiner

*Primary Examiner*—Twyler Lamb
*Assistant Examiner*—Jacky X. Zheng
(74) *Attorney, Agent, or Firm*—Jeannette M. Walder

(57) ABSTRACT

A method for color cast removal in a scanned image in L*a*b* space includes generating a first color cast correction curve for mapping L* to a first color correction, $\Delta a^*$, (or $\Delta b^*$) wherein the first correction curve provides a desired a* shift in midtone regions and is modulated as a function of L* such that black and white points are unaffected; for each pixel n in the scanned image, passing $L^*_n$ through the first color cast correction curve for obtaining a value of $\Delta a^*_n$; and adding the value of $\Delta a^*_n$ to the scanned image's original $a^*_n$ component. To ensure that the color corrected a* remains within gamut, a second correction curve for applying a clipping factor to the mapped $\Delta a^*$ may be generated with the $a^*_n$ passing through the second correction curve for obtaining a clipping factor $C_n$; and modifying the $a^*_n$ value by $C_n(\Delta a^*_n)$.

10 Claims, 2 Drawing Sheets

CYAN TRC

MAGENTA TRC

YELLOW TRC

METHOD FOR COLOR CAST REMOVAL IN SCANNED IMAGES

FIELD OF THE INVENTION

This invention relates generally to electronic imaging, and more particularly, to a method of removing color cast in scanned images.

BACKGROUND OF THE INVENTION

Color cast is generally considered an overall color imbalance in an image, as if viewed through a color filter. Color cast appears when one dominant color appears as a trace in all other colors in an image. The predominance of the color ruins the whole image. Many images will have a single-color cast, where for example, the entire image has a blue tint, or a red tint, or a yellow tint. There are also color casts with hues between primary colors, such as yellow/green as opposed to a pure yellow cast. There are many techniques for removing color cast, such as background removal and hue shift. Background removal linearly stretches or normalizes each separation such that the lightest pixels are mapped into white. Hue shift adds or subtracts a color at each pixel.

Previous methods for performing color cast removal or hue shift in an image path have used RGB space or CMY space, where three tone reproduction curves (TRC's) can be used to make small adjustments in the separations. TRC's are also used to describe adjustments to an image (whether for lightness/darkness, midtone contrast, highlight emphasis, color cast, etc.). Similar Look-Up Tables (LUT's) are also used to describe non-tone related adjustments or transfer functions often included in a conversion from one color space to another color space, for example, from RGB to CMY, from RGB to L*a*b*, from L*a*b* to CMY. These LUT's are often collectively referred to as TRC's although their use may not be tone related. TRC's or LUT's may be implemented in a graphical form (see FIGS. 1-3) or as a table stored in memory.

When the image path is processing in a different color space (such as CIE L*a*b*), changing into and back out of RGB or CMY can be time consuming and may result in image degradation due to quantization errors and round-off errors. When the image path is processing in L*a*b* space, simply adding an offset in a* and b* can result in a change in an established white point as well as illegal values outside the color gamut. Finding a white point and a black point in an image and linearly adjusting the separation image values between these points has the effect of removing most of the color cast in an image, particularly in the highlights and shadows. But some residual color cast may remain in the midtones, so a method for removing color cast in the midtones is desired.

U.S. Pat. No. 6,469,805 to Behlok for "Post Raster Image Processor Controls for Digital Color Image Printing" describes a system which allows a user to adjust image characteristics of a post-processing contone image to improve the image aesthetics. The user may adjust image characteristic such as lightness/darkness, midtone contrast, highlight emphasis, shadow emphasis and color cast. The user inputs signals through a user interface which are applied to a image control, which adjusts the characteristics of the printed image by modifying the tone reproduction curves (TRC's) with which the post-RIP contone file is printed. The adjustments are applied in CMYK color space. Behlok relies on histograms to generate the appropriate TRC modifications. Behlok does not address the generation of the specific TRC's to adjust the particular image characteristics.

U.S. Pat. No. 4,972,257 to Birnbaum, et al. for "Operator Adjustable Color Image Processing" discusses color correction in L*a*b* space, but the described techniques are not suitable for color cast correction. In Birnbaum's method, a measured set of primary color densities is changed to a set of colorimetric conditions. The operator adjusts the colorimetric conditions using TRC's so that the copy has the desired hue, saturation and darkness.

U.S. Pat. No. 5,233,413 to Fuchsberger, for "Electronic Image Processing with Automatic Color Corrections" describes a method of automatically detecting color cast and compensating for it. In Fuchsberger's method, the original RGB image is scanned and a luminance value generated for each of multiplicity of regions of the original image. The luminance values are divided into segments so that different segments are classified as color dominant or color non-dominant. At least one second value is calculated for each of the segments and the calculation includes assigning different weights to dominant and non-dominant regions such that the second value for each segment represents an overall color cast for the regions of the respective segment. Each of the second values is adjusted with reference to the gray point to generate a respective third value and a correction plot for each of the primary colors. The chrominance-luminance plots may take the form of a series of connected straight line segments or a monotonically increasing curve. The adjusted overall chrominance values represent the original overall chrominance values as compensated for color casts. The adjustments are applied in RGB color space. Automatic color cast determination does not afford an operator the ability to adjust for color cast to make a more humanly aesthetic color appearance. Also, adjustments in RGB space may not transfer linearly to L*a*b* space.

U.S. Pat. No. 6,484,631 to Degani, et al. for "Method and System of Individualizing Tone Reproduction Curves Calibration and Applying Thereof" describes a method of updating individualized calibrated tone reproduction curves corresponding to a distinct media type and halftone type. Degani also describes a method of adjusting a plurality of TRC's based on the calibration of a single TRC using a reference media and a reference halftone(s). All the operations are performed on CMY&K separations. L*a*b* may be used in determining the current calibration, but is not used for mapping the new calibration into a family of stored calibrations.

SUMMARY OF THE INVENTION

Many printers convert input signals from RGB space to L*a*b* space where image modifications are made and then convert from L*a*b* space to CMYK space. Performing image modifications in L*a*b* space has several advantages, including: L*a*b* space is a standard interconnection space for devices and is device neutral; L*a*b* space is a uniform space; L*a*b* space reproduces colors most closely to how humans perceive them; and L*a*b* space is also preferred for archival purposes.

A method for correcting color casts in L*a*b* space, according to the invention, allows the user to displace the middle of the neutral axis by a given a* and b* value, while going to the proper white and black point at the end points. The method of the invention also keeps the displaced colors from being pushed out of gamut by decreasing the change in a* and b* for large a* and b*. The method of the invention overcomes the problems of previous methods which work in CMY or RGB space and require two color mapping steps for use on an L*a*b* image, potentially causing image degradation through quantization and round-off errors. The method of the invention eliminates the need for such extra mapping, saving time and preserving image quality.

A method for color cast removal in a scanned image, according to the invention, includes generating a first color cast correction curve for mapping L* to a first color correction, $\Delta a^*$, in L*a*b* space, wherein the first correction curve provides a desired a* shift in midtone regions and is modulated as a function of L* such that black and white points are unaffected; for each pixel n in the scanned image, passing $L^*_n$ through the first color cast correction curve for obtaining a value of $\Delta a^*_n$; and adding the value of $\Delta a^*_n$ to the scanned image's original $a^*_n$ component. To ensure that the color corrected a* remains within gamut, the method may further include generating a second correction curve for applying a clipping factor to the mapped $\Delta a^*$ for ensuring that the color corrected a* remains within gamut; passing $a^*_n$ through the second correction curve for obtaining a clipping factor $C_n$; and modifying the $a^*_n$ value by $C_n(\Delta a^*_n)$. Note that the $\Delta a^*_n$ may have positive or negative values, and the clipping factor $C_n$ curves to zero on either the highest or lowest value depending on whether the $\Delta a^*_n$ is positive or negative.

For adjusting color cast in the b* component, a method for color cast removal in a scanned image, includes generating a third color cast correction curve for mapping L* to a second color correction $\Delta b^*$ in L*a*b* space, wherein the third correction curve provides a desired b* shift in midtone regions and is modulated as a function of L* such that black and white points are unaffected; for each pixel n in the scanned image, passing $L^*_n$ through the third color cast correction curve for obtaining a value of $\Delta b^*_n$; and adding the value of $\Delta b^*_n$ to the scanned image's original $b^*_n$ component. To ensure that the color corrected b* remains within gamut, the method may further include generating a fourth correction curve for applying a clipping factor to the mapped b* for ensuring that the mapped b* remains within gamut; passing $b^*_n$ through the fourth correction curve for obtaining a clipping factor $C_n$; and modifying the $b^*_n$ value by $C_n(\Delta b^*_n)$.

The color cast correction may be in any arbitrary hue direction. In this case, the color cast removal is accomplished by using a vector combination of $\Delta a^*$ and $\Delta b^*$ values and adding $\Delta a^*$ to a* and $\Delta b^*$ to b*.

Each of the first and third color cast correction curves (for a* and b*) has a shape which, when viewed from an L* a* (or b*) coordinates, as L* increases from black to white, $\Delta a^*$ (or $\Delta b^*$) increases monotonically to an approximate midpoint then decreases monotonically, such that when L* is black or white, $\Delta a^*$ ($\Delta b^*$) is zero. The midpoint region of the curve is generally flat and smooth. The first color cast correction curve may be generated from two fourth order parametric equations of the form: $Y(x)=C_0+C_1{}^*x+C_2{}^*x^2+C_3{}^*x^3+C_4{}^*x^4$, which are splined together at the mid-point; and wherein constants $C_0 \ldots _n$ are determined by smoothness constraints such that the mid-section has a high degree of flatness and the two ends roll-off smoothly to zero.

The method of the invention allows color cast removal to be performed in the L*a*b* color space, thus eliminating possible quantization errors from converting to and from RGB or CMY color spaces in processing scanned images. Instead of passing the a* and b* separations through a full-scale to full-scale TRC, a color cast correction value is is calculated for each pixel (from the color cast correction curve) and added to the a*b* separations. The color cast correction value is based on the desired a*b* shift in the midtones, but is modulated as a function of the L* luminance so that the white point and black point are not effected. The color cast correction value may also be further modified as a function of a* and b* so that the resulting sum will tend to remain within the gamut when a* or b* is near the edge of the space.

DETAILED DESCRIPTION OF THE EMBODIMENTS

Figure 1:
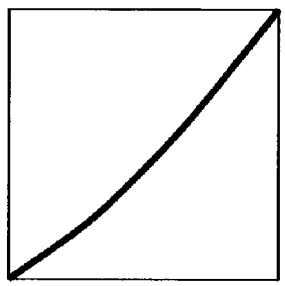
FIGS. 1-3 are graphs of three standard TRC's for cyan, magenta and yellow separations.
Figure 2:
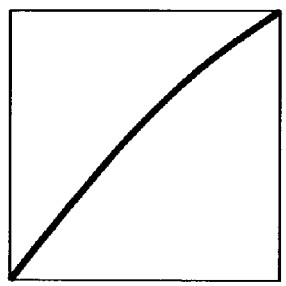
Figure 3:
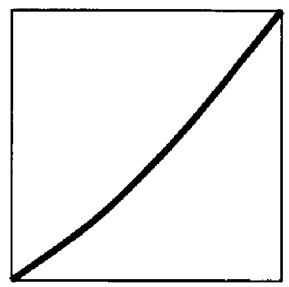

Previous methods for performing color cast correction (or hue shift) used RGB space or CMY space, where three TRC's were generated to make small adjustments in each of the separations as needed. Exemplary TRC's for cyan, magenta and yellow are shown in FIGS. 1-3, respectively. Many image processing systems use L*a*b* space in the image path, it is desirable to perform any color cast correction in the same space in order to avoid multiple quantization steps in conversion between spaces.

Figure 4:
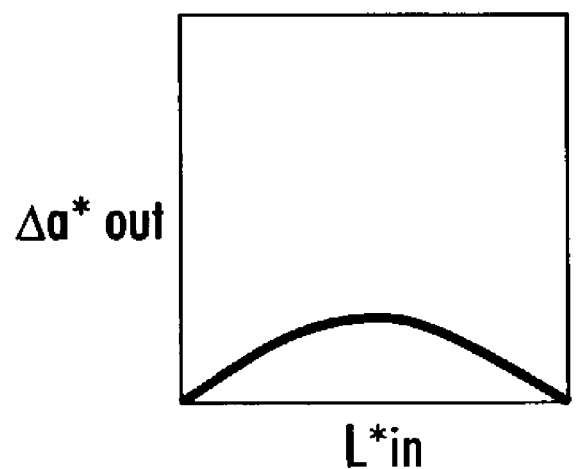
FIG. 4 is a graph of a color cast removal correction curve.
Figure 5:
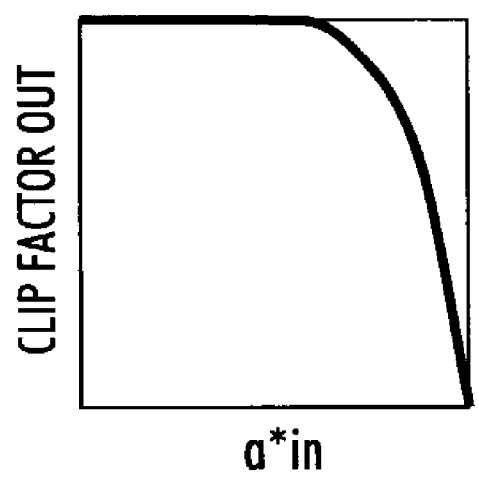
FIG. 5 is a graph of a clipping factor curve.

Instead of a full-scale to full-scale TRC, the method of the invention uses a color correction curve based on L* for each of a* and b*, and then multiplies the result by a clipping function to ensure that the new values do not exceed full scale. Referring to FIG. 4, a color cast correction curve according to the invention is shown. This curve has L* as the X-axis and $\Delta a^*$ as the Y-axis. When L* has a zero value (it is black), $\Delta a^*$ is zero. Similarly, when L* has its maximum value (it is white), $\Delta a^*$ is also zero. For values of L* between zero and maximum, $\Delta a^*$ increases monotonically until it reaches a value in the midtone area, then decreases monotonically towards zero. When $\Delta a^*$ is zero, this means there is no color cast correction. To insure that the corrected values of a* do not exceed valid gamut values, a second correction curve may be used. The second correction curve generates a clipping value which is used to decrease the value of $\Delta a^*$ as needed. A clipping function curve for positive $\Delta a^*$ is shown in FIG. 5. Referring to FIG. 5, the clipping function curve has a* as the X-axis and the clip factor C as the Y-axis. When a* has low values, C has a value of 1. When a* starts to increase, C decreases until it is zero for the maximum value of a*. For example, to apply a color cast correction which moves towards magenta, for each pixel a value of $\Delta a^*$ is determined by L* from the first curve, a correction C is determined by a* from the second curve, then the $\Delta a^*$ is modified by C and is added to the a* value.

For each pixel n in a scanned image:
Pass $L^*_n$ through the first color cast correction curve (FIG. 4) to get a $\Delta a^*_n$ value. Then pass $a^*_n$ through the second TRC to get a clipping factor $C_n$. (FIG. 5) Multiply the value of $\Delta a^*$ by the clipping factor: $\Delta a^*_n{}'=\Delta a^*_n(C_n)$. Add the $\Delta a^*_n{}'$ to the value: $a^*_n{}''=a^*_n+\Delta a^*_n{}'$.

This will have the effect of moving the hue towards magenta primarily in the midtones, without affecting either the white point or the black point. Also for high-chroma magentas in the midtones, the shift will be progressively less so that the image will be less likely to be clipped. The example is shown for a positive a* shift. For a negative shift, the $\Delta a^*$ will be negative and the clipping function would be flipped horizontally. $\Delta a^*_n{}'$ is the color cast correction to the a* value that would be applied before the a* value is converted to CMY space, i.e., a*+Δa*'.

Changes to b* are processed in a similar way as the a* example. Complementary color cast correction curves would be developed for the b* changes.

Color cast correction curves and clipping factor curves may be implemented graphically, using circuits or as lookup tables. The invention has been described with respect to L*a*b* space, but would work for any Opponent color space, including for example L*u*v* space, Lch space, etc. In L*a*b* color space, changes in any arbitrary hue direction are handled with a combination of a* and b* changes with Δa* and Δb* being the x and y components of the desired hue vector. In L*u*v* color space, Δu* and Δv* would replace Δa* and Δb*. In Lch color space, a Δh* based on L and a C based on c would be used.

The color cast correction curves may be generated from (i.e., the shape of the Δa* and Δb* look-up tables may be determined by) parametric $4^{th}$-degree spline equations. The equations are of the form:

$$Y(x) = C_0 + C_1{}^*x + C_2{}^*x^2 + C_3{}^*x^3 + C_4{}^*x^4$$

There are two equations for each table-look-up, one for the first half of the table and one for the second half. The two equations are splined together at the mid-point.

The constants $C_{0 \ldots n}$ are determined by the smoothness constraints that are desired, namely that the mid-section has a high degree of flatness and the two ends roll-off smoothly to zero. The $4^{th}$-degree equations permit five constraints to be specified. Mathematically, the constraints for the equation for the first half where $0 \leq x \leq x\_mid$ are:

Y(0.0)=0.0 the left end-point value is zero

Y"(0.0)=0.0 the second derivative is zero at the left end-point

Y(x_mid)=Delta_Max the value at the mid-point is the desired maximum delta

Y'(x_mid)=0.0 the first derivative is zero at the mid-point

Y"(x_mid)=0.0 the second derivative is zero at the mid-point.

The constraints for the second half where $x\_mid \leq x \leq x\_max$ are:

Y(x_max)=0.0 the right end-point value is zero

Y"(x_max=0.0) the second derivative is zero at the right end-point

Y(x_mid)=Delta_Max the value at the mid-point is the desired maximum delta

Y'(x_mid)=0.0 the first derivative is zero at the mid-point

Y"(x_mid)=0.0 the second derivative is zero at the mid-point.

The zero second derivatives at the end-points provide the smooth roll-off to zero deltas. The zero second derivative at the mid-point provides extra smoothness and flatness in the mid section.

While these equations and constraints have provided good color-cast adjustment performance, any table-look-up values with similar curve shape characteristics may also be used.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for color cast removal in a scanned image, comprising:

processing the scanned image in L*a*b* space; and correcting for color cast in L*a*b* space without reference to another color space, comprising:

generating a first color cast correction curve for mapping L* to a first color correction, Δa*, in L*a*b* space, wherein the first correction curve provides a desired a* shift in midtone regions and is modulated as a function of L* such that black and white points are unaffected;

for each pixel n in the scanned image, passing $L^*_n$ through the first color cast correction curve for obtaining a value of $\Delta a^*_n$; and adding the value of $\Delta a^*_n$ to the scanned image's original $a^*_n$ component.

2. The method of claim 1, further comprising:

generating a second correction curve for applying a clipping factor to the mapped Δa* for ensuring that the color corrected a* remains within gamut;

passing $a^*_n$ through the second correction curve for obtaining a clipping factor $C_n$; and modifying the $a^*_n$ value by $C_n(\Delta a^*_n)$.

3. The method of claim 2, further comprising:

generating a third color cast correction curve for mapping L* to Δb* in L*a*b* space, wherein the first correction curve provides a desired b* shift in midtone regions and is modulated as a function of L* such that black and white points are unaffected;

generating a fourth correction curve for applying a clipping factor to the mapped b* for ensuring tat the mapped b* remains within gamut;

for each pixel n in the scanned image, passing $L^*_n$ through the third color cast correction curve for obtaining a value of $\Delta b^*_n$;

passing $b^*_n$ through the fourth correction curve for obtaining a clipping factor $C_n$; and modifying the $b^*_n$ value by $C_n(\Delta b^*_n)$.

4. The method of claim 3, wherein a color cast correction in any arbitrary hue direction comprising a vector combination of a* and b* values is accomplished with a vector combination of the corresponding modified Δa* and modified Δb* values.

5. The method of claim 1, wherein the first color cast correction curve has a shape which as L* increases from black to white, Δa* increases monotonically to an approximate midpoint then decreases monotonically, such that when L* is black and white, Δa* is zero.

6. The method of claim 1, wherein the first color cast correction curve is generated from two fourth order parametric equations of the form:

$$Y(x) = C_0 + C_1{}^*x + C_2{}^*x^2 + C_3{}^*x^3 + C_4{}^*x^4$$

which are splined together at the mid-point; and wherein constants $C_{0 \ldots n}$ are determined by smoothness constraints such that the mid-section has a high degree of flatness and the two ends roll-off smoothly to zero.

7. The method of claim 1, wherein L*a*b* space is replaced with L*u*v* space.

8. The method of claim 1, wherein L*a*b* space is replaced wit Lch color space.

9. A method for color cast removal in a scanned image, comprising:

generating a third color cast correction curve for mapping L* to a second color correction Δb* in L*a*b* space, wherein the third correction curve provides a desired b* shift in midtone regions and is modulated as a function of L* such that black and white points are unaffected;

for each pixel n in the scanned image, passing $L^*_n$ through the third color cast correction curve for obtaining a value of $\Delta b^*_n$; and adding the value of $\Delta b^*_n$ to the scanned image's original $b^*_n$ component.

10. The method of claim 9, further comprising:

generating a fourth correction curve for applying a clipping factor to the mapped b* for ensuring that the mapped b* remains within gamut;

passing $b^*_n$ through the fourth correction curve for obtaining a clipping factor $C_n$; and modifying the $b^*_n$ value by $C_n(\Delta b^*_n)$.

* * * * *